US012162729B2

(12) United States Patent
Ijas et al.

(10) Patent No.: US 12,162,729 B2
(45) Date of Patent: Dec. 10, 2024

(54) CONSTRUCTION ELEVATOR ARRANGEMENT AND A METHOD FOR PRODUCING THE SAME

(71) Applicant: Kone Corporation, Helsinki (FI)

(72) Inventors: Mika Ijas, Helsinki (FI); Mikko Kukkola, Helsinki (FI); Matti Rasanen, Helsinki (FI); Anssi Venho, Helsinki (FI); Aki Haikonen, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 18/474,045

(22) Filed: Sep. 25, 2023

(65) Prior Publication Data

US 2024/0017964 A1 Jan. 18, 2024

Related U.S. Application Data

(63) Continuation of application No. PCT/EP2021/060540, filed on Apr. 22, 2021.

(51) Int. Cl.
*B66B 9/16* (2006.01)
*B66B 19/00* (2006.01)
(Continued)

(52) U.S. Cl.
CPC .............. *B66B 9/16* (2013.01); *B66B 19/005* (2013.01); *B66B 19/02* (2013.01); *B66B 19/04* (2013.01); *E04G 27/00* (2013.01)

(58) Field of Classification Search
CPC ......... B66B 19/005; B66B 19/02; B66B 9/16; B66B 19/04
See application file for complete search history.

(56) References Cited

U.S. PATENT DOCUMENTS 11,396,442 B2 * 7/2022 Wu ........................... B66B 9/00
2009/0127033 A1 * 5/2009 Korkeakangas ........ B66B 19/02 74/413

(Continued)

FOREIGN PATENT DOCUMENTS

CN 202321877 U * 7/2012
EP 1591406 A2 * 11/2005 ............ B66B 19/02

(Continued)

OTHER PUBLICATIONS

International Search Report and Written Opinion for International Application No. PCT/EP2021/060540 dated Nov. 26, 2021.

*Primary Examiner* — Diem M Tran
(74) *Attorney, Agent, or Firm* — Harness, Dickey & Pierce, P.L.C.

(57) ABSTRACT

A construction elevator arrangement and a method for producing the same includes a hoisting machinery, an electric cabinet, and cable drums positioned at the bottom of the shaft, an elevator car and a counterweight moving in the shaft, upper pulleys and rope suspenders fixed at an upper end of the lifting height of the construction elevator, and hoisting ropes being fixed to the rope suspenders during the operation of the construction elevator and gliding through the rope suspenders during an upwards jump of the construction elevator in the shaft. The hoisting ropes pass in a 2:1 roping between the car, the upper pulleys, the traction sheave, the counterweight, and the rope suspenders.

18 Claims, 5 Drawing Sheets

Figure 1:
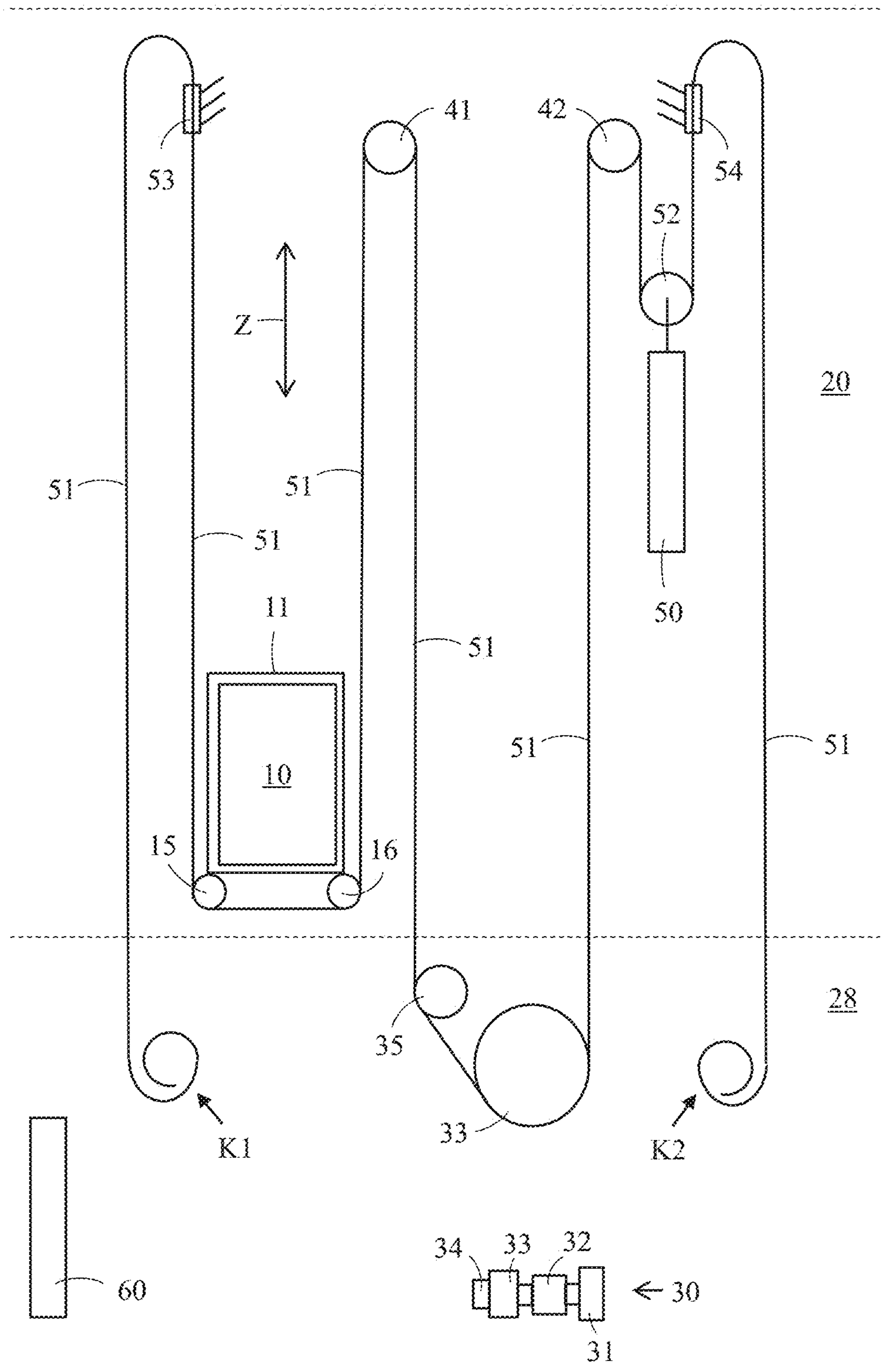

(51) Int. Cl.

| | |
|---|---|
| ***B66B 19/02*** | (2006.01) |
| ***B66B 19/04*** | (2006.01) |
| ***E04G 27/00*** | (2006.01) |

(56) References Cited

U.S. PATENT DOCUMENTS

| | | | | |
|---|---|---|---|---|
| 2013/0111723 | A1* | 5/2013 | Forsstrom ............... | B66B 19/02<br>29/401.1 |
| 2015/0034425 | A1 | 2/2015 | Ratia et al. | |
| 2020/0277158 | A1 | 9/2020 | Christen et al. | |

FOREIGN PATENT DOCUMENTS

| | | | | | |
|---|---|---|---|---|---|
| JP | 2020026320 | A * | 2/2020 | ............. | B66B 19/02 |
| WO | WO-0050328 | A2 * | 8/2000 | ............. | B66B 19/02 |
| WO | WO-2004/094289 | A1 | 11/2004 | | |
| WO | WO-2018091597 | A1 * | 5/2018 | | |

* cited by examiner

CONSTRUCTION ELEVATOR ARRANGEMENT AND A METHOD FOR PRODUCING THE SAME

CROSS-REFERENCE TO RELATED APPLICATION

This application is a continuation of PCT International Application No. PCT/EP2021/060540 which has an International filing date of Apr. 22, 2021, the entire contents of which are incorporated herein by reference.

FIELD

The invention relates to a construction elevator arrangement and to a method for producing the same. A construction elevator is used in the construction stage of a building.

BACKGROUND

Construction elevators are needed in the construction stage of especially high-rise buildings to transport constructors and/or equipment to the floors in the building.

An arrangement based on jump-lifts may be used in the construction stage of buildings. The hoisting height of the construction elevator may be increased in steps of one or more floor levels each time the building has reached a predetermined height above the previous jump. The hoisting machinery and/or the electric cabinet and/or the cable drums of the construction elevator may be arranged in the shaft at the top of the lifting height of the construction elevator.

The hoisting machinery may comprise the drive, the electric motor, the traction sheave, and the machinery brake. The electric cabinet may comprise the control equipment of the construction elevator and the electric power supply to the drive of the electric motor. The hoisting ropes are wound on the cable drums so that an additional length of the hoisting ropes may be unwound from each cable drum during the jump of the construction elevator.

This means that all this heavy equipment of the construction elevator must be transported upwards in the shaft during each jump. The equipment of the construction elevator must before the transport upwards be detached from their attachments and then again attached when the desired height has been reached. The car of the construction elevator may hang from a first side of the traction sheave and the counterweight may hang from a second opposite side of the traction sheave.

The time required to raise the construction elevator at each jump may be considerable in prior art jump-lift concepts.

SUMMARY

An object of the present invention is to present a novel construction elevator arrangement and a novel method for producing the same.

The construction elevator arrangement is defined in claim 1.

The method for producing a construction elevator arrangement is defined in claim 10.

The novel construction elevator arrangement reduces the time required for each jump.

There is no need to move heavy equipment such as the hoisting machinery, the electric cabinet, and the cable drums during the jump of the construction elevator. Only the upper pulleys and the rope suspenders are moved upwards during the jump.

The hoisting machinery, the hoisting ropes, the rope suspenders, the upper pulleys, and the electric cabinet form a reusable construction elevator unit. The frame construction supporting the rope suspenders and the upper pulleys may also form a part of the reusable construction elevator unit. The reusable construction elevator unit may be removed from the shaft when the building has been completed and the construction elevator is changed to a permanent elevator. The reusable construction elevator unit may then be used in another building to be constructed.

DRAWINGS

Figure 2:
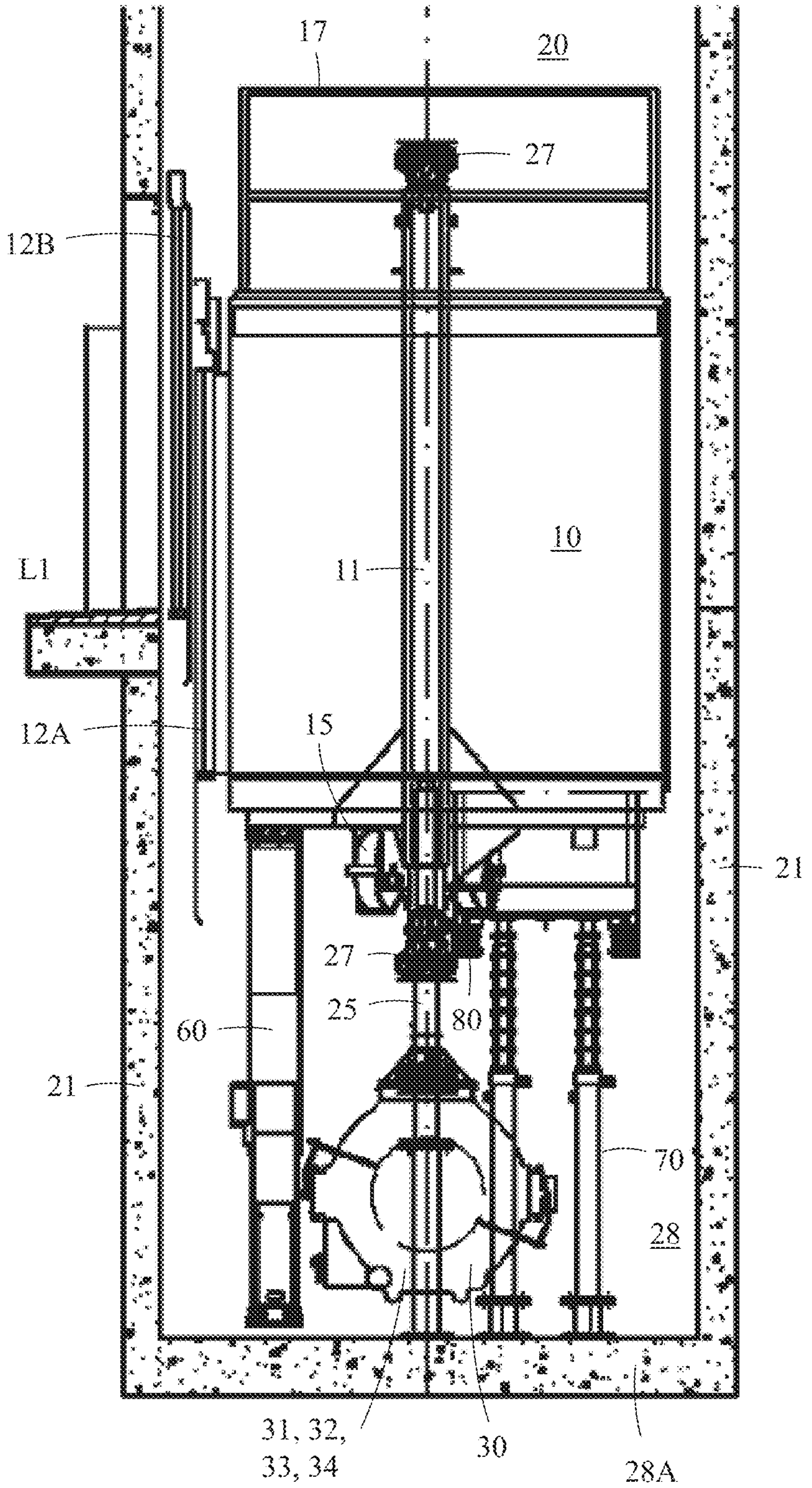
Figure 3:
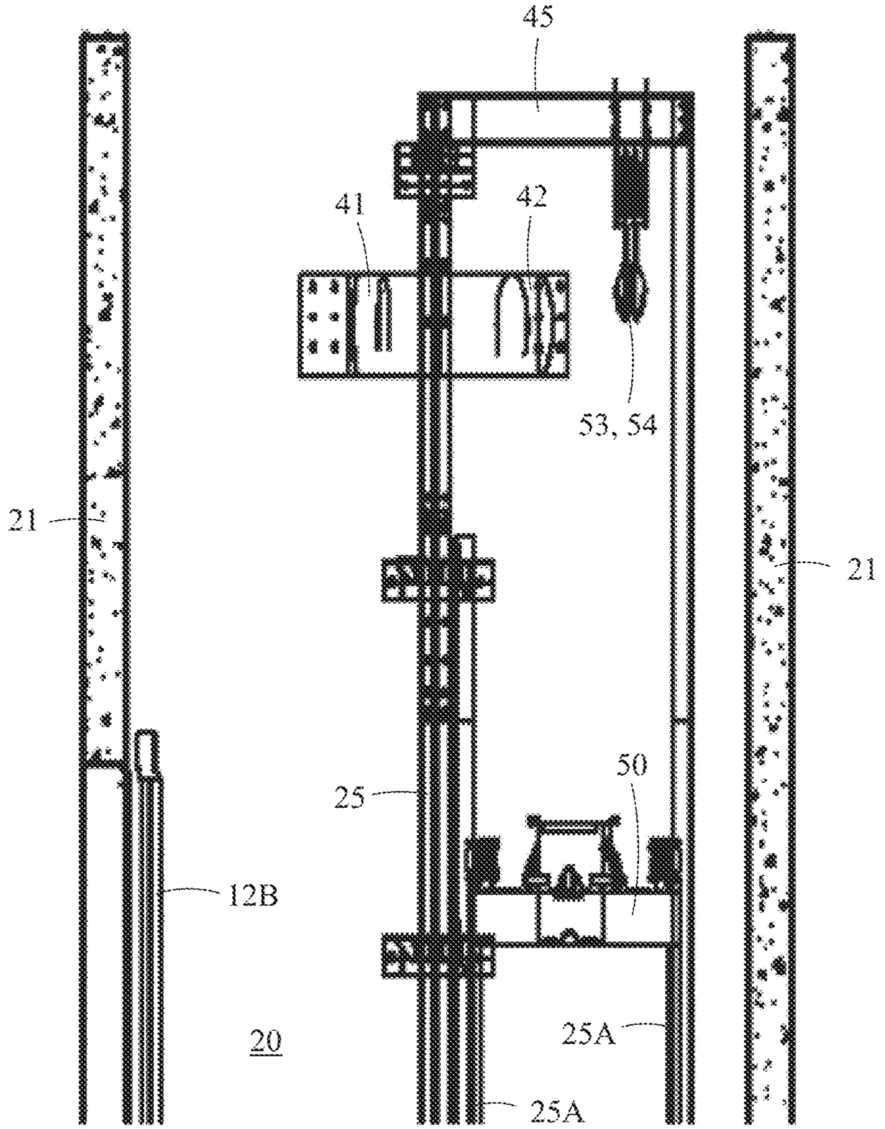
Figure 4:
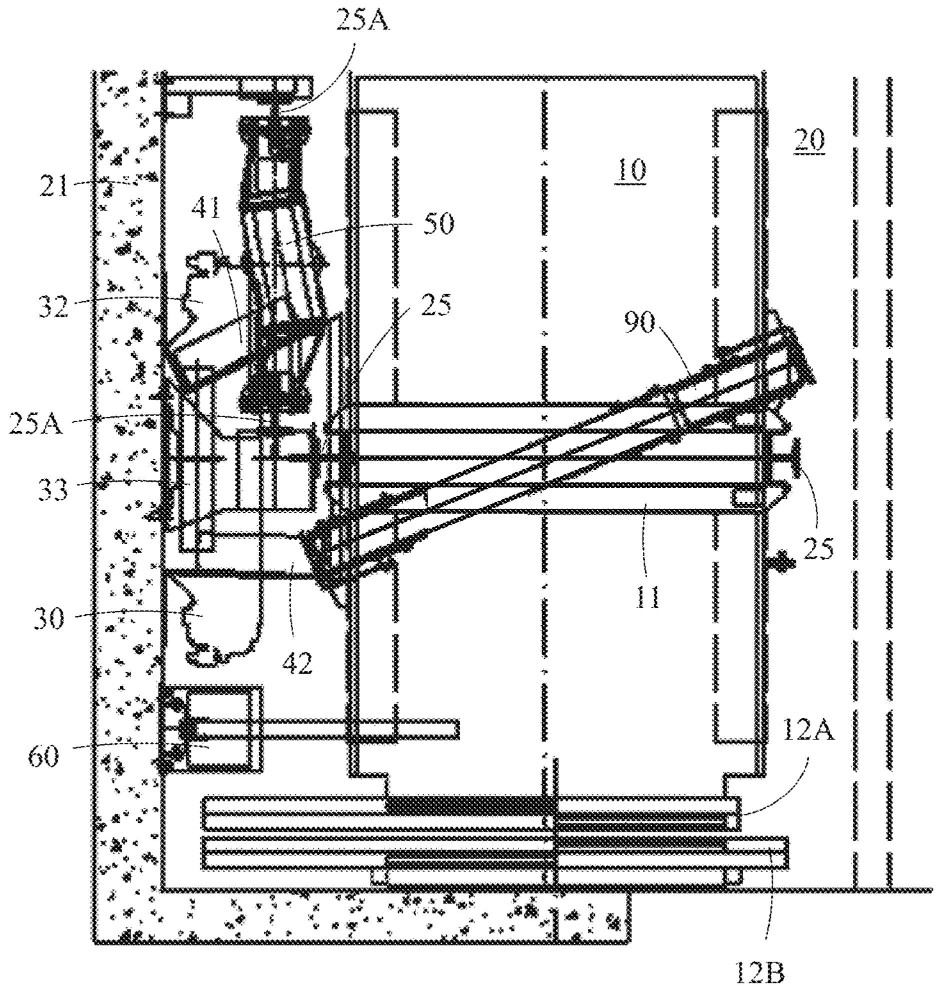
Figure 5:
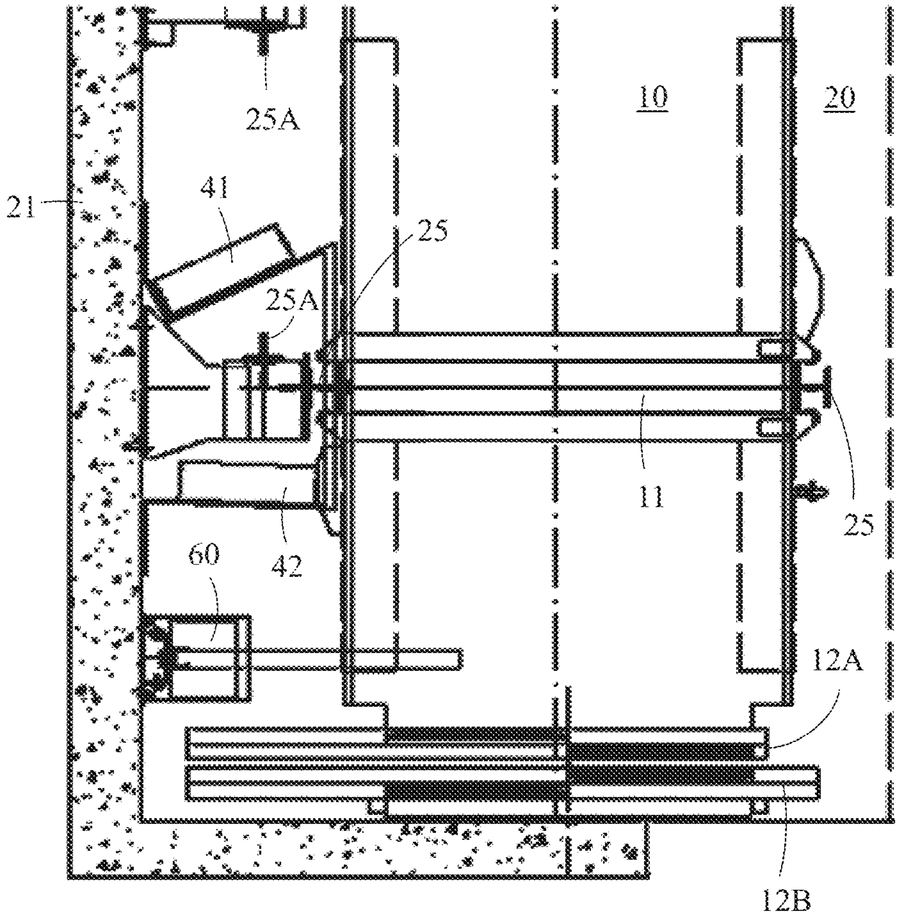

The invention will in the following be described in greater detail by means of preferred embodiments with reference to the attached drawings, in which:

FIG. 1 shows a schematic view of a construction elevator arrangement according to the invention, FIG. 2 shows a vertical cross-sectional view of the pit with the hoisting machinery and the car, FIG. 3 shows a vertical cross-sectional view of a portion of the shaft with the upper sheaves, FIG. 4 shows a first horizontal cross-sectional view of the construction elevator, FIG. 5 shows a second horizontal cross-sectional view of the construction elevator.

DETAILED DESCRIPTION

FIG. 1 shows a schematic view of a construction elevator arrangement according to the invention.

The figure is divided in the height direction with two horizontal dashed lines. The area between the two horizontal dashed lines represents the shaft 20 and the area below the lower horizontal dashed line represents the pit 28.

The construction elevator arrangement comprises a car 10 moving in the shaft 20, a counterweight 50 moving in the shaft 20, a hoisting machinery 30 for moving the car 10, hoisting ropes 51 connecting the car 10 to the counterweight 50, and pulleys 15, 16, 41, 42, 52 for directing the run of the hoisting ropes 51. A separate or an integrated car frame 11 may surround the car 10. The car frame 11 may have a generally rectangular shape. The car frame 11 may comprise two horizontal support beams and two vertical support beams. The outer ends of the horizontal support beams may be attached to the vertical support beams. The car 10 is thus supported within the car frame 11.

The hoisting machinery 30 is shown separately at the bottom of the figure. The hoisting machinery comprises a drive 31, an electric motor 32, a traction sheave 33, and a machinery brake 34. The hoisting machinery 30 may be formed as one unit so that the parts of the unit are attached to each other. The hoisting machinery 30 is positioned in the pit 28 of the elevator shaft 20. The hoisting machinery 30 moves the car 10 in a vertical direction Z upwards and downwards in the vertically extending elevator shaft 20. The machinery brake 34 may stop the rotation of the traction sheave 33 and thereby the movement of the elevator car 10. The drive 31 may comprise a frequency converter for driving the electric motor 32 with a variable speed.

An electric cabinet 60 is further shown separately at the bottom of the figure. The electric cabinet 60 comprises the control equipment of the construction elevator and the electric power supply to the drive 31 of the electric motor 32. The electric cabinet 60 is also positioned in the pit 28 of the shaft 20.

The car frame 11 may be connected by the hoisting ropes 51 via the traction sheave 33 and upper pulleys 41, 42 to the counterweight 50. The car frame 11 may further be supported with guiding means at guide rails extending in the vertical direction in the shaft 20. The guiding means may comprise rolls rolling on the guide surfaces of the guide rails or gliding shoes gliding on the guide surfaces of the guide rails when the car 10 is moving upwards and downwards in the elevator shaft 20. The guide rails may be attached with fastening brackets to the side wall structures in the elevator shaft 20. The guiding means keep the car 10 in position in the horizontal plane when the car 10 moves upwards and downwards in the elevator shaft 20. The guiding means, the guide rails and the fastening brackets are not shown in the figure. The counterweight 50 may be supported in a corresponding way on guide rails that are attached to the wall structure of the shaft 20. The car 10 may be supported on car guide rails and the counterweight may be supported on separate counterweight guide rails.

The roping disclosed in the figure is a 2:1 roping. The ratio between the movement of the hoisting rope 51 on the traction sheave 33 and the movement of the car 10 in the shaft 20 is thus 2:1. The hoisting ropes 51 are attached above the top of the lifting height of the car 10 with rope suspenders 53, 54 to a frame structure attached to one or more walls of the shaft 20. The rope suspenders 53, 54 may comprise a locking mechanism for locking and unlocking the hoisting ropes 51 passing through the rope suspenders 53, 54. The locking mechanism may be formed of a clamp arrangement through which the hoisting ropes 51 pass. The hoisting ropes 51 may be pressed between opposite clamp parts in the clamp arrangement. Tightening of the clamp locks the hoisting ropes 51 in place in the rope suspender 53, 54 and loosening of the clamps allows the hoisting ropes 51 to glide through the rope suspender 53, 54. The tightening may be done e.g. with bolts moving one of the clamp parts. The hoisting ropes 51 may after passing through the rope suspenders 43, 54 be directed downwards towards the pit 25 at the bottom of the shaft 20. The hoisting ropes 51 may be wound on cable drums K1, K2 in the pit 25. Each end of the hoisting rope 51 could be wound of a cable drum K1, K2 of its own. If e.g. three parallel hoisting ropes 51 would be used, then three cable drums K1, K2 would be needed for each end of the hoisting ropes 51 i.e. six cable drums K1, K2 all together.

The hoisting ropes 51 pass from the first rope suspender 53 downwards to a first car pulley 15 and further horizontally to a second car pulley 16. The car pulleys 15, 16 may be positioned at the outer ends of a skewed pulley beam (shown in FIG. 4) extending across the bottom beam of the car frame 11. The skewed pulley beam may extend in the horizontal direction. The car frame 11 and thereby also the car 10 may thus be supported on the skewed pulley beam and thereby on the hoisting ropes 51 passing over the car pulleys 15, 16. The hoisting ropes 51 pass after the second car pulley 16 upwards to a first upper pulley 41 and then downwards to a diverting pulley 35 and further to the traction sheave 33. The hoisting ropes 51 pass after the traction sheave 33 upwards to a second upper pulley 42 and further downwards to a counterweight pulley 52 and then finally upwards to the second rope suspender 54. The counterweight 50 is hanging from the counterweight pulley 52.

The car 10 may transport people and/or goods between the landings in the building.

FIG. 2 shows a vertical cross-sectional view of the pit with the hoisting machinery and the car.

The car 10 is positioned in the lowest position below the lowermost landing L1. A sill of the car doors 12A is positioned below a sill of the landing doors 12B. The buffers 70 are positioned on the bottom floor 28A of the pit 28. The hoisting machinery 30 may be attached to a wall in the pit 28. The electric motor 31 may be positioned in an inverted position in the shaft 20. The traction sheave 33 may be positioned close to the wall 21 of the shaft 20 so that the hoisting ropes 51 may pass upwards near the wall 21 of the shaft 20.

The electric cabinet 60 comprising the control equipment of the construction elevator and the electric power supply to the drive 31 of the electric motor 32 is also positioned on the bottom floor 28A of the pit 25. The electric cabinet 60 may be formed of only one electric cabinet or of several separate electric cabinets attached to each other.

The car frame 11 is supported via guide means 27 on the guide rails 25. The guide means 27 are supported on the vertical support beams of the car frame 11. The guide means 27 may be formed of roller means rolling on the guide surfaces of the guide rails.

One of the two car pulleys 15 is also shown in the figure below the car 10.

The handrails 17 on the roof of the car 10 are also shown in the figure.

The hoisting machinery 30 comprising the drive 31, the electric motor 32, the traction sheave 33 and the machinery brake 34 may be formed as one integrated unit.

The car 10 is also provided with safety brakes 80 acting on the guide rails 25. Any suitable prior art safety brakes 80 may be used in the car 10. The safety brakes 80 may be supported on the car frame 11.

FIG. 3 shows a vertical cross-sectional view of a portion of the shaft with the upper pulleys.

The upper pulleys 41, 42 are positioned one after the other in a direction perpendicular to the paper. The upper pulleys 41, 42 are supported on a frame structure 45. The rope suspenders 53, 54 are also supported on the same frame structure 45. The part of the frame structure 45 that supports the upper pulleys 41, 42 passes in front of the guide rails 25 in view of the side wall 21 of the shaft 20.

The counterweight 50 is positioned on one side wall 21 in the shaft 20. One of the counterweight guide rails 25A is positioned adjacent to the car guide rail 25 and the other counterweight guide rail 25A is positioned near the back wall of the shaft 20.

The jump of the construction elevator to the next level in the shaft 20 may be done in the following way.

The car 10 is moved to an upper position and the counterweight 50 is moved to a lower position so that the counterweight 50 is supported on the buffers 70 in the pit 28. The car 10 is then supported on a lifting point positioned above the car 10 in the shaft 20. The rope suspenders 53, 54 may then be opened so that the hoisting ropes 51 may glide through the rope suspenders 53, 54. The lifting point may be formed of e.g. an installation platform moving in the shaft 20 above the construction elevator or of a support beam extending across the shaft 20. The lifting point may be lifted with a main hoist. An installation platform may be used for the installation of the guide rails and other elevator equipment in the shaft 20 above the construction elevator. The car 10 may be lifted so that the car 10 is suspended from the lifting point. The lifting point and thereby also the car 10 may then be lifted with the main hoist upwards in the shaft 20. Another possibility would be to fix the lifting point at the height of the next jump in the shaft 20. The main hoist would then lift the car 10 upwards to the desired height position in the shaft 20.

Before the car 10 is lifted, the support structure 45 must be detached from the side wall 21 of the shaft 20 and attached by an adapter to the car 10. The upper pulleys 41, 42 and the rope suspenders 53, 54 must also be detached from the shaft 20 and attached by suitable adapters to the car 10 before the car 10 is lifted. The support structure 45, the upper pulleys 41, 42 and the rope suspenders 53, 54 are thus transported upwards in the shaft 20 on the car 10. The necessary new length of the hoisting ropes 51 will be unwound from the cable drums K1, K2 positioned in the pit 28 of the shaft 20. When the desired height in the shaft 20 has been reached, the support structure 45, the upper pulleys 41, 42 and the rope suspenders 53, 54 may be attached to the walls 21 and the guide rails 25 in the shaft 20. The rope suspenders 53, 54 may then be closed, the machinery brake 34 may be activated, and a protection platform may be arranged above the construction elevator. The installation of the elevator continues above the construction elevator and the protection platform prevents objects from falling on the construction elevator.

The safety brakes of the car 10 and/or the safety brakes of the counterweight 50 are not normally used during the jump of the construction elevator. They could naturally be used if desired.

FIG. 4 shows a first horizontal cross-sectional view of the construction elevator.

The hoisting machinery 30 comprising the drive 31, the electric motor 32, the traction sheave 33 and the machinery brake 34 is attached to a side wall 21 of the shaft 20.

The upper pulleys 41, 42 are positioned in the shaft 20 at the upper end of the lifting height of the construction elevator. The hoisting ropes 51 from a first side of the traction sheave 33 to the first upper pulley 41 and from an opposite second side of the traction sheave 33 to the second upper pulley 42.

The frame 11 of the car 10 is supported with guiding means on the car guide rails 25.

The counterweight 50 is supported with guiding means on the counterweight guide rails 25A.

The skewed pulley beam 90 passes below the horizontal support beam of the frame 11 of the car 10.

The electric cabinet 60 is positioned at the bottom of the pit 28. The electric cabinet 60 comprises the control equipment of the construction elevator and the electric power supply to the drive 31 of the electric motor 32. The electric cabinet 60 is also positioned in the pit 28 of the shaft 20.

The car doors 12A and the landing doors 12B at the front wall of the shaft 20 are further shown in the figure.

The frame 45, the upper pulleys 41, 42, and the rope suspenders 53, 54 may be supported on the car 10 during the upwards movement in the shaft 20 in the jump of the construction elevator.

FIG. 5 shows a second horizontal cross-sectional view of the construction elevator.

FIG. 5 corresponds to FIG. 4 except that the hoisting machinery 30, the counterweight 50 and the skewed pulley beam 54 has been removed from FIG. 5.

The pit 28 may be provided with one or more water pumps for pumping water from the pit 28 in case of water leaking into the pit 28. The equipment positioned in the pit 28 will thus be protected from water damages.

The hoisting machinery 30, the electric cabinet 60, the hoisting ropes 51, the rope suspenders 53, 54, the upper pulleys 41, 42 and the frame construction 45 may be removed from the shaft 20 when the building is completed and the construction elevator is changed to a permanent elevator. The above-mentioned equipment may form a reusable construction elevator unit which may be reused in a construction elevator in other buildings to be constructed. The permanent elevator may then be constructed so that the hoisting machinery is positioned in the upper end of the shaft. The car 10 and the counterweight 50 will then be hanging from the traction sheave of the permanent elevator.

The hoisting rope 51 may be formed of a rope or of a belt.

The construction elevator arrangement in the figures comprises two upper pulleys 41, 42. There could naturally be more than two upper pulleys 41, 42 if needed.

The construction elevator arrangement in the figures comprises two elevator car pulleys 15, 16 positioned at a bottom of the car 10. The car 10 could naturally be supported in any way with any number of car pulleys 15, 16 on the hoisting ropes 51. The car pulleys 15, 16 could e.g. be positioned at the roof of the car 10.

The number of cable drums K1, K2 in the pit 28 depends on the number of parallel hoisting ropes 51 used in the construction elevator arrangement. If e.g. three parallel hoisting ropes 51 would be used, then three cable drums K1, K2 would be needed for each end of the hoisting ropes 51 i.e. six cable drums K1, K2 all together.

The number of rope suspenders 53, 54 at the upper end of the lifting height of the construction elevator may be chosen according to the specific situation in each case. There could be e.g. two rope suspenders 53, 54, wherein one or several parallel hoisting ropes 51 could pass through each rope suspender 53, 54. Each hoisting rope 51 could on the other hand be provided with a rope suspender of its own.

A diverting pulley 35 is in FIG. 1 arranged in the pit 28. The need of one or more diverting pulleys 35 depends on the desired run of the hoisting ropes 51 in the shaft 20. A diverting pulley 35 might not be needed at all if the desired run of the hoisting ropes 51 is achieved with only the traction sheave 33.

The upper pulleys 41, 42 and the rope suspenders 53, 54 are supported on a common frame construction 45 in the figures. The upper pulleys 41, 42 and the rope suspenders 53, 54 could on the other hand be supported with any kind of frame constructions indirectly or directly to the walls 21 in the shaft 20.

It will be obvious to a person skilled in the art that, as the technology advances, the inventive concept can be implemented in various ways. The invention and its embodiments are not limited to the examples described above but may vary within the scope of the claims.

The invention claimed is:

1. A construction elevator arrangement comprising a hoisting machinery comprising a drive, an electric motor, a traction sheave, and a machinery brake provided at a bottom of an elevator shaft, an electric cabinet provided at the bottom of the shaft, the electric cabinet comprising control equipment of a construction elevator and an electric power supply to the drive of the electric motor, an elevator car and a counterweight being movably arranged in the shaft, upper pulleys being fixedly arranged at an upper end of a lifting height of the construction elevator, rope suspenders being fixedly arranged at the upper end of the lifting height of the construction elevator, cable drums positioned in a pit at the bottom of the shaft, and hoisting ropes being fixed to the rope suspenders during operation of the construction elevator and gliding through the rope suspenders during an upwards jump of the construction elevator in the shaft, the hoisting ropes passing in a 2:1 roping between the car, the upper pulleys, the traction sheave, the counterweight, and the rope suspenders, free portions of the hoisting ropes outside the rope suspenders passing downwards from each rope suspender from among the rope suspenders to respective cable drums from among the cable drums.

2. The construction elevator arrangement as claimed in claim 1, wherein the upper pulleys and the rope suspenders are supported on a frame construction, said frame construction being supported on walls and/or on guide rails in the shaft.

3. The construction elevator arrangement as claimed in claim 1, wherein the hoisting machinery is mounted in an inverted position in the pit so that the hoisting ropes pass upwards from the traction sheave.

4. The construction elevator arrangement as claimed in claim 1, wherein the hoisting machinery is supported on a wall and/or on a guide rail attached to said wall in the pit.

5. The construction elevator arrangement as claimed in claim 4, wherein the traction sheave is positioned closer to the wall in the pit compared to the electric motor.

6. The construction elevator arrangement as claimed in claim 1, wherein the hoisting machinery is formed as an integrated unit comprising the drive, the electric motor, the traction sheave, and the machinery brake.

7. The construction elevator arrangement as claimed in claim 1, wherein the hoisting machinery, the hoisting ropes, the rope suspenders, the upper pulleys, and the electric cabinet form a reusable construction elevator unit in a building, the reusable construction elevator unit being removed from the shaft when the building has been completed and the construction elevator is changed to a permanent elevator, the reusable construction elevator unit being used in another building to be constructed.

8. The construction elevator arrangement as claimed in claim 1, wherein the car is provided with adapters for receiving the rope suspenders and the upper pulleys during the upwards jump of the construction elevator.

9. The construction elevator arrangement as claimed in claim 1, wherein an installation platform is arranged to be movable upwards and downwards in the shaft above the upper pulleys and the rope suspenders.

10. A method for producing a construction elevator arrangement comprising providing a hoisting machinery comprising a drive, an electric motor, a traction sheave, and a machinery brake at a bottom of an elevator shaft, providing an electric cabinet at the bottom of the shaft, the electric cabinet comprising control equipment of a construction elevator and an electric power supply to the drive of the electric motor, arranging an elevator car and a counterweight in a movable manner in the shaft, arranging upper pulleys in a fixed manner at an upper end of a lifting height of the construction elevator, arranging rope suspenders in a fixed manner at the upper end of the lifting height of the construction elevator, arranging cable drums in a pit at the bottom of the shaft, and arranging hoisting ropes to be fixed to the rope suspenders during operation of the construction elevator and gliding through the rope suspenders during an upwards jump of the construction elevator in the shaft, the hoisting ropes passing in a 2:1 roping between the car, the upper pulleys, the traction sheave, the counterweight, and the rope suspenders, free portions of the hoisting ropes outside the rope suspenders passing downwards from each rope suspender from among the rope suspenders to respective cable drums from among the cable drums.

11. The method for producing a construction elevator arrangement as claimed in claim 10, comprising supporting the upper pulleys and the rope suspenders on a frame construction, said frame construction being supported on walls and/or on guide rails in the shaft.

12. The method for producing a construction elevator arrangement as claimed in claim 10, comprising mounting the hoisting machinery in an inverted position in the pit so that the hoisting ropes pass upwards from the traction sheave.

13. The method for producing a construction elevator arrangement as claimed in claim 10, comprising supporting the hoisting machinery on a wall and/or on a guide rail attached to said wall in the pit.

14. The method for producing a construction elevator arrangement as claimed in claim 13, comprising positioning the traction sheave closer to the wall in the pit compared to the electric motor.

15. The method for producing a construction elevator arrangement as claimed in claim 10, comprising forming the hoisting machinery as an integrated unit comprising the drive, the electric motor, the traction sheave, and the machinery brake.

16. The method for producing a construction elevator arrangement as claimed in claim 10, comprising forming the hoisting machinery, the hoisting ropes, the rope suspenders, the upper pulleys, and the electric cabinet as a reusable construction elevator unit in a building, the reusable construction elevator unit being removed from the shaft when the building has been completed and the construction elevator is changed to a permanent elevator, the reusable construction elevator unit being used in another building to be constructed.

17. The method for producing a construction elevator arrangement as claimed in claim 10, comprising attaching the rope suspenders and the upper pulleys to the car with adapters during the upwards jump of the construction elevator.

18. The method for producing a construction elevator arrangement as claimed in claim 10, comprising arranging an installation platform to be movable upwards and downwards in the shaft above the upper pulleys and the rope suspenders.

* * * * *